March 15, 1949.     T. A. RICH     2,464,612
SELF-CALIBRATING METERING SYSTEM
Filed Oct. 28, 1947
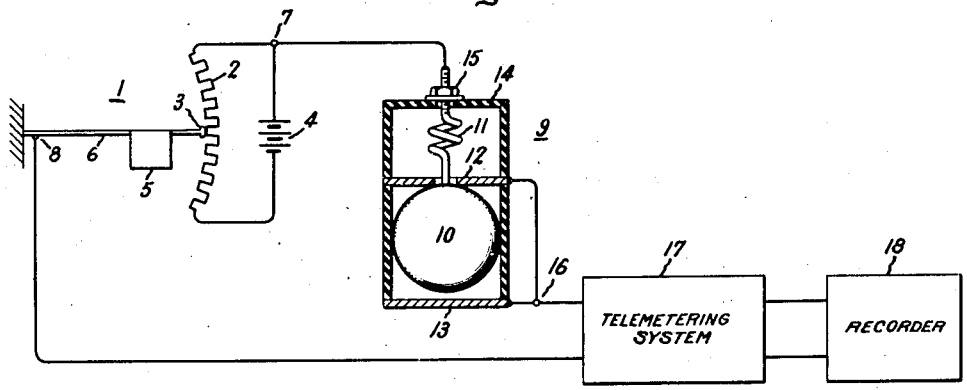
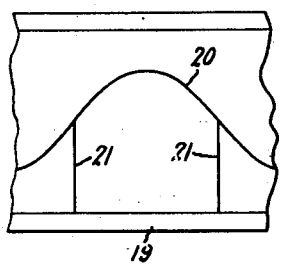
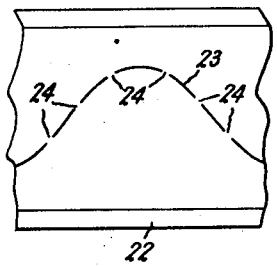
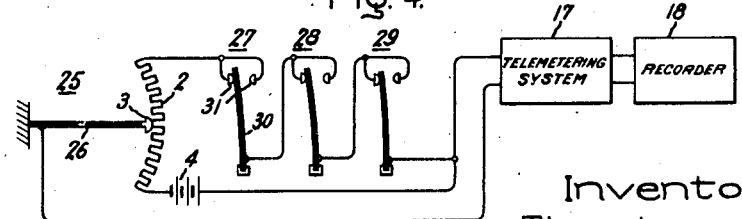
Inventor:
Theodore A. Rich,
by    Prowell P. Mack
His Attorney.

Patented Mar. 15, 1949

2,464,612

UNITED STATES PATENT OFFICE 2,464,612

SELF-CALIBRATING METERING SYSTEM

Theodore A. Rich, Schenectady, N. Y., assignor to General Electric Company, a corporation of New York Application October 28, 1947, Serial No. 782,495

4 Claims. (Cl. 177—351)

My invention relates to telemetric apparatus, and its principal object is to provide means for increasing the accuracy of wide-range measurements recorded by a telemetric recording system. Other objects and advantages will become apparent as the description proceeds.

In general, it is much more difficult to obtain a high degree of accuracy in a wide-range measuring instrument than it is to obtain a like degree of accuracy in a single-value instrument. For example, a pressure detector adapted to open a contact at a pressure of 75.3 pounds per square inch can be compensated for a number of errors, such as temperature, acceleration, etc., at this one point, and thus can be made to indicate this predetermined single value with great accuracy, for example, to within 0.1%. In a wide-range instrument capable of continuously measuring all pressures between 0 and 100 pounds per square inch, for example, the attainment of comparable accuracy would be difficult if not impossible. In telemetric applications the single-value instrument has further advantages, since additional errors may be introduced in the indicated output of the wide-range instrument by calibration errors, drift, and signal distortions originating in the telemetering system. Since the output of a single-value instrument may be simply an "on" or "off" indication, it is less subject to these additional errors.

I obtain highly accurate measurements over a continuous wide range of values by using several instruments to measure the same quantity. A wide-range instrument continuously measures changes in the quantity measured, and one or more single-value instruments accurately indicate predetermined reference values of the same quantity. These reference values serve to calibrate the indications of the wide-range instrument. By providing a sufficient number of single-value instruments, each adjusted to indicate a different reference value, a very high degree of accuracy can be obtained. The number of single-value instruments required depends upon the degree of accuracy desired, the range to be covered, and the accuracy obtainable with the wide-range instrument alone.

In many telemetering systems in which accurate, wide-range measurements are desired, there is only one channel available with which to transmit signals from both wide-range and single-value instruments. Furthermore, it is often necessary that the telemetering terminal equipment be as small, light, and simple as possible. This is particularly important in such cases as radio sonde and aircraft applications. In such cases elaborate modulation apparatus is not feasible. Also, it is desirable that the signals from single-value instruments retain a simple "on" or "off" character throughout the system to prevent signal distortion errors. Furthermore, it is desirable that the indications of both wide-range and single-value instruments be recorded substantially simultaneously upon a single chart to facilitate calibration of the wide-range values in terms of the more accurate reference values. In general, I secure these results by so arranging my apparatus that single-value instruments momentarily interrupt the output signal of the wide-range instrument at predetermined reference values of the measured quantity.

The features of my invention which are believed to be novel and patentable are pointed out in the claims appended hereto. For a better understanding of my invention, reference is made in the following description to the accompanying drawing, in which Fig. 1 is a schematic diagram of one form of apparatus embodying my invention; Fig. 2 is a section of a chart showing one form of graphic record made using my invention; Fig. 3 is a section of another chart showing another form of graphic record made using my invention; and Fig. 4 is a schematic diagram of another form of apparatus embodying my invention.

Referring now to Fig. 1 of the drawing, a form of apparatus embodying my invention is shown which may be used to measure and record values of acceleration. A wide-range acceleration measuring instrument 1 comprises a potentiometer 2 having an adjustable tap 3, a battery 4, or other voltage source, connected to apply a voltage across the ends of potentiometer 2, and a weight 5 supported by a cantilever spring 6. The left-hand end of spring 6 is rigidly supported, but the right-hand end is free to deflect responsive to acceleration forces acting on weight 5. This positions tap 3 so that an output voltage is provided between points 7 and 8 which varies responsive to changes in the value of acceleration.

A single-value acceleration measuring instrument 9, subject to the same acceleration forces as instrument 1, comprises a weight 10 supported by a spring 11, two metal plates 12 and 13, and an electrically insulating case 14. The tension of spring 11 may be adjusted by nut 15 to hold weight 10 against plate 12 until, for example, an acceleration of 2 g., twice the force of gravity, is attained. The distance between plates 12 and 13 may be such, for example, that when the value of acceleration reaches 2.02 g., weight 10 will contact plate 13. It will be noted that when weight 10 is in contact with either plate 12 or plate 13, an electric circuit is closed from point 7 to point 16 through spring 11, weight 10, and the plate contacted, and the output voltage of instrument 1 appears between point 16 and point 8. But when the value of acceleration passes between 2 g. and 2.02 g., weight 10 travels from its position in contact with plate 12 to a position in contact with plate 13, the electrical circuit between points 7 and 16 is thus momentarily opened, and the appearance of the output voltage between points 16 and 8 is momentarily interrupted.

A telemetering system 17 is adapted to reproduce the voltage appearing between points 16 and 8 at the input terminals of a recorder 18. In its simplest form, system 17 may be a mere pair of wires joining the measuring instruments to the recorder, or it may, for example, be a frequency-modulated radio link whose frequency varies responsive to the voltage between points 16 and 8. Such telemetering systems are well known in the art and need not be described further here.

Recorder 18 may be any type of electrical recorder, preferably one which has suitable means to adjust its "zero" recording position to correspond to a signal voltage other than zero. In the preferred form of my invention shown in Fig. 1 of the drawing, zero acceleration will produce a positive signal voltage, and the recorder preferably should be adjusted so that zero signal voltage produces an off-scale negative reading. The reason for this will become apparent as the description proceeds. On some recorders this adjustment can be made by adjusting the tension in the pen arm restoring spring; in other cases it may be necessary to "buck out" part of the signal voltage by opposing it with a bias voltage of opposite polarity. This may easily be done by connecting a small battery in series with the recorder input terminals.

Referring now to Fig. 2, I have shown a section of a chart 19 on which values of acceleration have been recorded by apparatus of the type illustrated in Fig. 1. The smooth curve 20 is a continuous wide-range record of the changing value of acceleration, traced by the recorder in response to the reproduced output voltage of wide-range measuring instrument 1. The vertical lines 21 locate reference points at which the value of acceleration is known to be within the limits 2g. and 2.02g. At these reference points the single-value measuring instrument 9 momentarily interrupted the signal voltage as hereinbefore explained, and thus, with a zero signal input, the recorder momentarily registered an off-scale negative reading due to the bias or zero adjustment hereinbefore described. In traveling off-scale and almost immediately thereafter returning substantially to its former position, the recorder pen traced vertical lines 21'.

In some cases a single reference value, as hereinbefore described, will be sufficient to calibrate the wide-range values to the required degree of accuracy. More often a plurality of different reference values will be desired. These may be obtained by adding an additional single-value instrument for each such additional reference value. The sets of electrical contacts controlled by the respective single value instruments should all be connected in series, so that any one of the single value instruments can open the electrical circuit and thus interrupt the signal supplied to the recorder. For example, in measuring temperature it might be desirable to provide a wide-range thermometric instrument to continuously measure temperature over the entire range desired, and to provide a plurality of single-value thermometric instruments to indicate successive 10 degree reference levels. Accurate calibration would then be possible even if the indications of the wide-range instrument were as much as 5 degrees in error, provided only that such error is consistent within each 10 degree range.

Referring now to Fig. 4, I have shown a form of thermometric apparatus embodying my invention. Wide-range measuring instrument 25 comprises a potentiometer 2 having an adjustable tap 3, a battery 4 connected as shown, and a bi-metallic thermometric element 26, adapted to change the position of tap 3 responsive to changes in the temperature measured. Three single-value measuring instruments 27, 28 and 29 subject to the same measured temperature, each comprise a bimetallic thermometric element 30 and a pair of electrical contacts 31, as shown. Each single-value instruments is adjusted to measure a different reference value of temperature. At its respective reference value, each bimetallic element 30, responsive to a change in temperature, undergoes a motion of its free end from a position in contact with one of its associated electrical contacts 31 to a position in contact with the other such electrical contact. This momentarily opens the electrical circuit, thus interrupting the signal voltage transmitted to the recorder to provide a calibration point as hereinbefore explained.

A possible refinement is the use of a null-balance recorder, of a type known in the art, which will print a record on the chart only when the position of the recorder pen corresponds to the input signal. Such a recorder will not print during the negative off-scale indications at each reference level. Fig. 3 shows a section of a chart 22 on which a record 23 has been printed by such a recorder. Three different reference values are shown by spaces 24. Each space is the result of the recorder failing to print during the off-scale indication period when the input signal was interrupted by a single-value measuring instrument.

In accordance with the patent statutes, I have described the principle of my invention, together with the apparatus which I now consider to represent the best embodiment thereof; but I wish it to be understood that the apparatus shown is only illustrative and that the invention may be carried out by other means.

What I claim as new and desire to secure by Letters Patent of the United States is:

1. In a telemetering system, the combination of a wide-range measuring instrument comprising a potentiometer having an adjustable tap, means to apply a voltage across the end terminals of the potentiometer, and means to position the adjustable tap responsive to the value of a measured quantity, so that said wide-range measuring instrument provides an output voltage between the tap and a fixed point on the potentiometer which varies responsive to changes in the measured quantity; telemetering means adapted to reproduce said output voltage at a location remote from the measuring instrument; a recorder adapted to produce a record of the measured quantity responsive to the reproduced output voltage; and a single-value measuring instrument, responsive to a single value of the same measured quantity; having electric contacts arranged to interrupt momentarily the output voltage transmitted from the wide-range instrument at a predetermined value of said quantity as measured by the single-value instrument, so that the recorder momentarily registers off-scale at such predetermined value to provide a calibration point on the record.

2. In a telemetering system, the combination of a wide-range measuring instrument adapted to produce an electric signal which varies responsive to changes in a quantity measured by said instrument, telemetering means adapted to reproduce said electric signal at a location remote from the measuring instrument, a recorder adapted to produce a record of the measured quantity responsive to the reproduced electric signal, and a single-value measuring instrument adapted to measure the same quantity and to interrupt momentarily said electric signal at a predetermined value of said quantity as measured by the single-value instrument, to indicate a reference value from which other recorded values may be calibrated.

3. In a recording system, the combination of a wide-range measuring instrument adapted to produce an electric signal which varies responsive to changes in a quantity measured by said instrument, means including a recorder adapted to produce a record of the measured quantity responsive to said electric signal, and a single-value measuring instrument, adapted to measure the same quantity, having electric contacts arranged to interrupt momentarily said electric signal at a predetermined value of said quantity as measured by the single-value instrument, so that the recorder momentarily registers off-scale at such predetermined value to provide a calibration point on the record.

4. In a metering system, the combination of a wide-range measuring instrument adapted to produce an electric signal which varies responsive to changes in value of a quantity measured by said instrument, and a single-value measuring instrument adapted to measure the same quantity and to interrupt momentarily said electric signal at a predetermined value of said quantity as measured by the single-value instrument, to indicate a reference value from which other values of the electric signal can be calibrated.

THEODORE A. RICH.

REFERENCES CITED

The following references are of record in the file of this patent:

UNITED STATES PATENTS

| Number | Name | Date |
| --- | --- | --- |
| 889,533 | Maas | June 2, 1908 |
| 2,321,971 | Becker | June 15, 1943 |
| 2,374,439 | Korevec | Apr. 24, 1945 |

FOREIGN PATENTS

| Number | Country | Date |
| --- | --- | --- |
| 694,367 | Germany | July 31, 1940 |